US012749409B2

(12) United States Patent
Vangaveti

(10) Patent No.: US 12,749,409 B2
(45) Date of Patent: Sep. 29, 2026

(54) WEARABLE RECORDING DEVICE AND ARTIFICIAL INTELLIGENCE MODEL

(71) Applicant: Honeywell International Inc., Charlotte, NC (US)

(72) Inventor: Dhanunjaya Kumar Vangaveti, Hyderabad (IN)

(73) Assignee: Honeywell International Inc., Charlotte, NC (US)

( * ) Notice: Subject to any disclaimer, the term of this patent is extended or adjusted under 35 U.S.C. 154(b) by 30 days.

(21) Appl. No.: 18/917,856

(22) Filed: Oct. 16, 2024

(65) Prior Publication Data

US 2026/0105856 A1 Apr. 16, 2026

(51) Int. Cl.

| | |
|---|---|
| ***G09B 5/06*** | (2006.01) |
| ***G06V 20/40*** | (2022.01) |
| ***H04N 7/18*** | (2006.01) |

(52) U.S. Cl.

CPC ............. *G09B 5/065* (2013.01); *G06V 20/40* (2022.01); *H04N 7/188* (2013.01)

(58) Field of Classification Search

CPC ......... G09B 5/065; G06V 20/40; H04N 7/188

USPC .......................................................... 386/228

See application file for complete search history.

(56) References Cited

U.S. PATENT DOCUMENTS

| | | | | |
|---|---|---|---|---|
| 12,470,605 | B2 * | 11/2025 | Tacy | H04N 21/23418 |
| 12,499,146 | B2 * | 12/2025 | Cakir | G06F 16/35 |
| 2023/0386273 | A1 * | 11/2023 | Kamma | B60W 50/032 |
| 2024/0428262 | A1 * | 12/2024 | Vangaveti | G06Q 30/018 |

* cited by examiner

*Primary Examiner* — Helen Shibru

(74) *Attorney, Agent, or Firm* — Shumaker & Sieffert, P.A.

(57) ABSTRACT

An example technician assistance system includes: a wearable object including an image capture device embedded therein, the image capture devices configured to record video images of a technician performing a task; and a computing device including: a memory; and one or more processors coupled to the memory, implemented in circuitry, and configured to: generate, by one or more machine learning models, a knowledge base using the video images recorded by the image capture device and using at least one of structured data or unstructured data obtained from one or more data sources; analyze, by the one or more machine learning models, the video images of the technician performing the task to identify the task being performed; generate, by the one or more machine learning models, using the knowledge base, one or more suggestions related to the task being performed; and output the one or more suggestions.

20 Claims, 3 Drawing Sheets

WEARABLE RECORDING DEVICE AND ARTIFICIAL INTELLIGENCE MODEL

TECHNICAL FIELD

This disclosure describes techniques related to an Artificial Intelligence (AI)-powered technician assistance system.

BACKGROUND

Modern aircrafts are complex machines that require a high level of expertise to maintain. This complexity, combined with incomplete and often unclear documentation, creates a significant challenge for Maintenance, Repair, and Overhaul (MRO) technicians. Adding to the complexity is the rapidly changing regulatory environment.

SUMMARY

Maintenance, Repair, and Overhaul (MRO) facilities are essential facilities for aviation companies to keep their aircraft in top working condition. MRO technicians may perform routine checks, inspections, and adjustments to ensure aircrafts are safe and airworthy. When aircraft components or systems malfunction, MRO technicians may diagnose and fix the problems. Such repairs may range from minor repairs to major overhauls. For components with significant wear and tear or after a certain number of flight hours, MRO technicians may conduct complete overhauls to restore one or more components to their original condition. Engine repairs and overhauls are an important part of MRO facility operations, as engines are critical components of aircraft. Auxiliary power units (APUs) provide power for various aircraft systems when the main engines are off. Landing gears are important for safe takeoff and landing, so landing gears may need regular maintenance and repairs as well. Airframe repairs and inspections may include checking the structural integrity of the fuselage, wings, and other components of the aircraft.

The disclosure describes techniques to employ an Artificial Intelligence (AI)-powered technician assistance system that may acts as a virtual assistant or colleague, offering real-time context-sensitive troubleshooting and repair assistance. By continuously monitoring steps performed by an MRO technician, the disclosed system may quickly identify relevant information from technical publications and/or from the recorded videos of the same task performed by other MRO technicians based on the specific problem encountered. In one example, the disclosed system may provide step-by-step guidance tailored to the situation, suggesting potential causes and solutions. Furthermore, by analyzing aircraft data, the disclosed AI-based system may anticipate potential issues and may recommend preventive maintenance procedures.

According to an example of the present disclosure, the disclosed technician assistance system may use a generative Machine Learning (ML) model specifically trained on aviation data to assist MRO technicians in real-time. The disclosed system may include a wearable body suit with a high-resolution capture device capturing live video feeds. As will be discussed in greater detail below, the video feed may be transmitted to a central server hosting the generative ML model. The generative ML model may analyze the video stream in real-time and may provide feedback to the technician through, for example, a handheld device such as, but not limited to, a tablet.

According to an example of the present disclosure, an Artificial Intelligence (AI)-based technician assistance system includes: a wearable object comprising an image capture device embedded therein, the image capture devices configured to record video images of a technician performing a task; and a computing device comprising: a memory; and one or more processors coupled to the memory, implemented in circuitry, and configured to: generate, by one or more machine learning models, a knowledge base using the video images recorded by the image capture device and using at least one of structured data or unstructured data obtained from one or more data sources; analyze, by the one or more machine learning models, the video images of the technician performing the task to identify the task being performed; generate, by the one or more machine learning models, using the knowledge base, one or more suggestions related to the task being performed; and output the one or more suggestions generated by the one or more machine learning models.

According to another example of the present disclosure, a method for providing AI-based technician assistance includes: recording, by a wearable object comprising an image capture device embedded therein, video images of a technician performing a task; generating, by one or more machine learning models, a knowledge base using the video images recorded by the image capture device and using at least one of structured data or unstructured data obtained from one or more data sources; analyzing, by the one or more machine learning models, the video images of the technician performing the task to identify the task being performed; generating, by the one or more machine learning models, using the knowledge base, one or more suggestions related to the task being performed; and outputting the one or more suggestions generated by the one or more machine learning models.

The details of one or more examples of the disclosure are set forth in the accompanying drawings and the description below. Other features, objects, and advantages will be apparent from the description, drawings, and claims.

DETAILED DESCRIPTION

Figure 1:
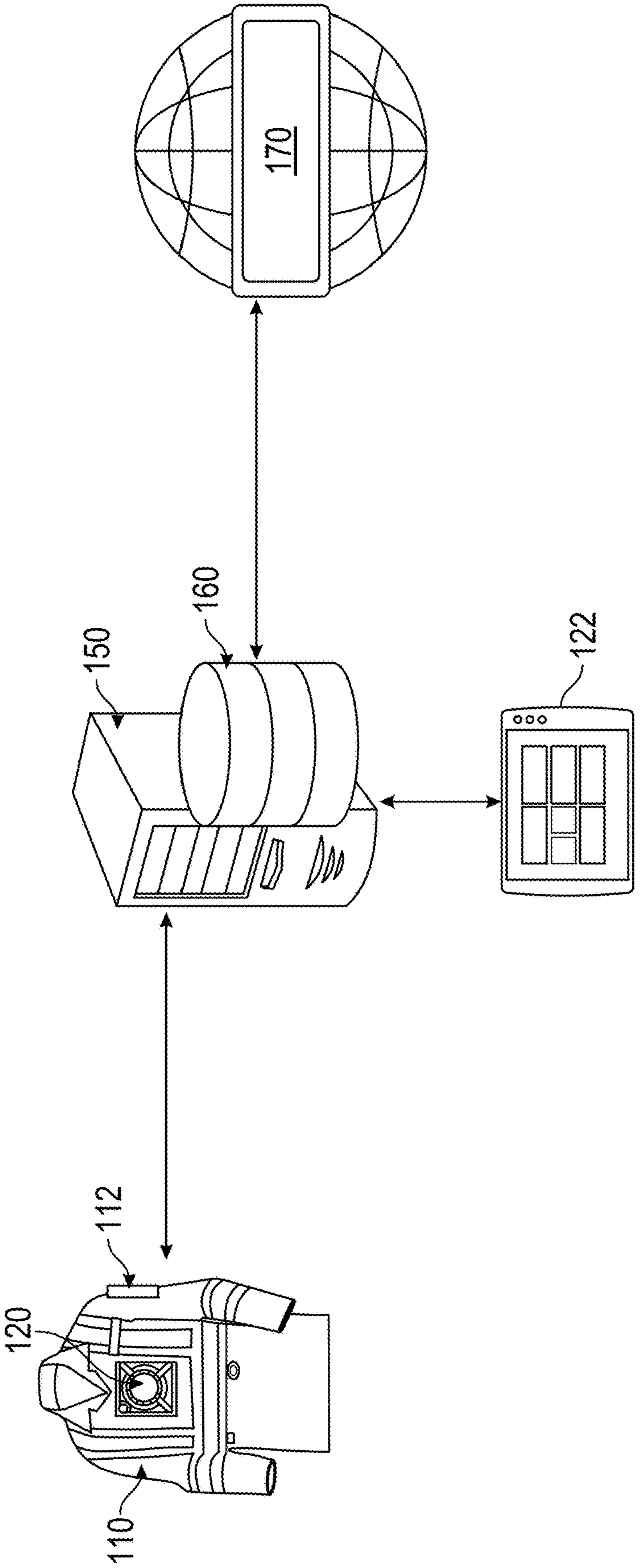
FIG. 1 is a simplified block diagram of an example Artificial Intelligence (AI)-based technician assistance system in accordance with at least some example techniques of the present disclosure.

Aircrafts undergo regular certification processes to ensure continued airworthiness and safety of the aircraft. The certification process typically involves a thorough inspection of the entire aircraft, including structure, systems, and components of the aircraft. Certification processes may occur at specific intervals, often determined by the age, type, and usage of the aircraft. In other words, certification processes may occur every few years or even more frequently for certain aircrafts. Certification inspections may cover everything from the airframe and engines to avionics and other aircraft systems. Such inspections typically identify any potential issues or defects that could compromise safety. Aircrafts should meet stringent safety standards and regulations set by aviation authorities. Certification processes ensure that aircrafts comply with the industry requirements.

The aviation industry is facing a significant challenge in finding qualified technicians to work in Maintenance, Repair, and Overhaul (MRO) centers. The shortage of qualified technicians is due to a combination of factors. Many experienced technicians might be nearing retirement age, creating a knowledge gap. The increasing appeal of white-collar positions has drawn many potential MRO technicians away from the shop floor. There is a general shortage of individuals with the necessary technical skills and experience to work in MRO centers. The knowledge transfer process is also an important issue. As experienced technicians retire, expertise of the experience technician may be lost. While aviation companies may be investing in training programs to bridge the knowledge gap, training programs may take time to develop the depth of knowledge and experience that comes with years on the job. The increasing number of aircrafts and the introduction of new models further exacerbate the problem. More aircrafts typically means a higher demand for maintenance and repairs, and new models often require specialized skills and training.

MRO technicians typically need to stay updated on the latest standards, which may be a daunting task, among many other challenges of their jobs. This constant need to adapt, coupled with the pressure to turn aircraft around quickly (to minimize costly downtime), may create a high-stress environment. These pressures may often result in a decline in maintenance quality. Technicians may rush through repairs to meet deadlines, leading to potential safety hazards. Moreover, the shortage of skilled MRO technicians exacerbates the problem. With fewer people to handle the workload, the pressure on existing staff intensifies, further impacting quality and efficiency.

While MRO facilities are primarily involved in maintaining and repairing an aircraft, the term encompasses a broader scope of activities. Such activities may include routine checks, inspections, and servicing to ensure aircraft airworthiness and operational efficiency. Routine checks and inspections may be regular procedures to ensure the aircraft is safe and operational. Servicing may involve tasks such as, but not limited to, oil changes, tire replacements, and component adjustments. The activities taking place at MRO facilities may involve fixing damaged components or systems to restore aircraft functionality. When parts are damaged or worn, MRO facilities may repair or replace them to restore the functionality of the aircraft. Such activities may further include a comprehensive inspection and refurbishment of an aircraft or its components to extend their lifespan. Refurbishment may be a more in-depth process that may involve cleaning, painting, and replacing worn-out parts to extend the life of the aircraft or components of the aircraft. Some additional activities at MRO facilities may include, but are not limited to, logistical aspects like parts management, scheduling, and quality control.

The challenge of keeping MRO technicians up-to-speed with the ever-evolving technology on modern aircraft is a complex one. While existing resources like technical publications and help guides are valuable, technical publications may have certain limitations. Searching through technical publications may be time-consuming, especially for complex troubleshooting. The aforementioned resources may not offer real-time guidance or suggest alternative solutions based on specific situations. Technical publications may not account for the latest updates or modifications made to aircraft systems.

This disclosure describes techniques that implement a comprehensive approach to address the challenges faced by MRO technicians. More specifically, the disclosure describes an Artificial Intelligence (AI)-powered technician assistance system that may acts as a virtual assistant or colleague, offering context-sensitive troubleshooting assistance. By continuously monitoring steps performed by a MRO technician, the disclosed system may quickly identify relevant information from technical publications and/or from recorded videos of the same task performed by other MRO technicians based on the specific problem encountered. Although certain techniques are described herein with respect to video, those techniques may also be applicable to audio. In one example, the disclosed system may provide step-by-step guidance tailored to the situation, suggesting potential causes and solutions. Furthermore, by analyzing aircraft data, the disclosed AI-based system may anticipate potential issues and recommend preventive maintenance procedures.

In the context of MRO facilities, guidance provided by the discloses AI-powered technician assistance system may be invaluable for ensuring that MRO technicians learn correct procedures, avoid mistakes, and develop the necessary skills for complex tasks like engine unmounting and mounting. Immediate correction of mistakes may help prevent errors that could lead to damage or safety hazards. In one example, the disclosed system may tailor guidance to the learning style and pace of the individual MRO technician. Essentially, experienced technicians may share their expertise and best practices with newer ones by using the disclosed system. By spotting potential errors before the errors occur, the AI-powered technician assistance system may help prevent costly mistakes. As yet another benefit, ensuring correct procedures are followed may improve safety and reduce the risk of accidents in MRO facilities.

According to an example of the present disclosure, the disclosed technician assistance system may use a generative Machine Learning (ML) model specifically trained on aviation data to assist MRO technicians in real-time. The disclosed system may include a wearable body suit with integrated high-resolution image capture device capturing live video feeds. The video feed may be transmitted to a central server hosting the generative ML model. The generative ML model may analyze the video stream in real-time and may provide feedback to the technician through, for example, a handheld device, such as, but not limited to, a tablet. Real-time suggestions based on a vast knowledge base may empower MRO technicians to make better decisions. Real-time monitoring and adherence to procedures may also contribute to a safer work environment.

By equipping technicians with wearable body suits equipped with high-resolution recording devices, the AI-based technician assistance system may capture detailed footage of every maintenance task. For example, technicians may wear suits equipped with high-resolution cameras and other sensors. The recording devices may capture detailed footage of every task performed by technicians. The captured footage may then be fed into an AI system. The collected data may provide a rich dataset of real-world maintenance activities. In one non-limiting example, the AI system may include a generative Machine Learning (ML) model that may be trained to analyze the footage in real-time. The generative AI model may identify patterns, best practices, and potential errors. Based on the analysis, the generative ML model may provide real-time feedback to the technician. For example, the generative ML model may suggest a more efficient way to complete a task or highlight a potential safety hazard. By identifying more efficient methods, technicians may complete tasks faster and with fewer errors. The ML model may provide personalized training recommendations based on the performance of the technician. The disclosed technician assistance system may detect potential safety hazards and may provide immediate feedback to the technician.

The generative ML model may identify potential issues or faults during the maintenance process and may provide suggestions to the technician (e.g., via a handheld computing device and/or a hands-free device). The generative ML model may constantly learn from new data, expanding knowledge base of the generative ML model and improving diagnostic capabilities over time. Therefore, the disclosed technician assistance system may be used as a training tool for new technicians, providing a valuable resource for learning and skill development.

By streamlining the troubleshooting process, the disclosed system may help reduce maintenance time and increase aircraft turnaround. Faster troubleshooting and efficient task guidance may significantly decrease repair times. As will be described in more detail below, the techniques of this disclosure may "transform" the technician into a data-collecting and problem-solving unit, with the AI acting as an intelligent assistant. The techniques of this disclosure may significantly enhance the efficiency and accuracy of aircraft maintenance.

In one non-limiting example, a technician may be performing a routine maintenance task on an engine. The disclosed technician assistance system may provide step-by-step instructions, highlighting important steps and offering visual aids. The system may also monitor the progress of the technician and may alert the technician if any errors are detected. In another non-limiting example, a technician may be working on a complex avionics system and may notice a warning light indicating a potential failure. The technician assistance system may recognize the warning code and may provide the technician with a detailed breakdown of the possible causes. The system may also suggest specific diagnostic tests and may identify the most likely component that needs to be replaced.

In this regard, FIG. 1 is a simplified block diagram of an example Artificial Intelligence (AI)-based technician assistance system 100 in accordance with at least some example techniques of the present disclosure. In accordance with the techniques of this disclosure, the technician assistance system 100 may include a wearable object 110 with sensor 112 including an object configured to be involved with a possible event (e.g., a future, upcoming, and/or anticipated event), and one or more sensors 112 (hereinafter "sensor" 112) secured to the wearable object 110. The sensor 112 may be configured to detect one or more stimuli that are associated with the possible event and transmit a sensor signal (e.g., using one or more communication elements operably coupled to the sensor 112) indicating data corresponding to the one or more stimuli. In accordance with the techniques of this disclosure, the technician assistance system 100 may also include one or more image capture devices (hereinafter "image capture device" 120) configured to record information (e.g., still images, video images, audio, heat readings, and combinations thereof) responsive to a triggering event determined from the data indicated by the sensor signal. In accordance with the techniques of this disclosure, the image capture device 120 may record information about the possible event responsive to a determination that a triggering event has occurred. As used herein, the term "wearable object with sensor" refers to any object that includes sensor 112 that is capable of detecting events that occur in proximity to the object. Examples of triggering events include, but are not limited to, identifying specific objects or items in the environment, detecting specific hand gestures or movements, detecting when the wearable object is touched, and the like.

As used herein, the term "image capture device" refers to digital and analog image capture devices, such as, for example, digital cameras, digital camcorders, analog cameras, analog camcorders, webcams, other image capture devices known in the art, and combinations thereof. The image capture device 120 may capture the real-time visual data of the environment surrounding an MRO technician. As used herein, the term "image" refers to both still images and video images. As used herein, the term "still image" refers to an image having a single frame. Also, as used herein, the term "video image" refers to an image having multiple frames. Furthermore, as used herein, the terms "image data" and "video data" refer to data corresponding to one or more images that have been captured by the image capture device 120. "Image data" and "video data" include sufficient information for a rendering playback device, such as a computing device 122, to reconstruct for presenting the one or more images (e.g., either of a lossless and a lossy reconstruction) corresponding to the image data. "Image data" may be analog data or digital data. "Image data" and "video data" may refer to uncompressed image data or video data, or image data or video data that has been compressed (e.g., using any of a variety of image compression protocols).

"Image data" may refer to both video image data and still image data (like a photo). "Video image data" refers to data corresponding to a series of still images that are configured to be viewed consecutively. As used herein, the term "in proximity to an object" refers to locations that are close enough to the wearable object 110 to trigger sensor 112 of the object 110. For example, if technicians bring their hand near the wearable object 110, the hand may trigger sensor 112. Often, events that are close enough to wearable object 110 to trigger sensor 112 may also be close enough to image capture device 120 to enable the image capture device 120 to record information corresponding to the event that triggers the sensor 112.

In accordance with the techniques of this disclosure, by way of non-limiting example, the wearable object 110 with sensor 112 may include an article of clothing (e.g., a body suit), a glove, a hat, a helmet, a watch, and other wearable articles/devices. As a specific, non-limiting example, the image capture device 120 may include a body camera embedded into a body suit worn by an MRO technician, as shown in FIG. 1. In accordance with the techniques of this disclosure, the body camera may begin recording video responsive to a detected triggering event.

In accordance with the techniques of this disclosure, the wearable object 110 with sensor 112 may further include a voice interface. A voice interface may enable hands-free operation, improving efficiency and safety. As a non-limiting example, an MRO technician may receive step-by-step instructions or torque specifications through an earpiece integrated with the wearable object 110.

Of course, many different applications may correspond to each of the different wearable devices, and may be associated with a variety of different stimuli.

In accordance with the techniques of this disclosure, the technician assistance system 100 may include one or more communication hubs 150 (sometimes referred to herein simply herein as "hub" 150) in communication with the sensor 112 and the image capture device 120 (e.g., using one or more communication elements). The hub 150 may be configured to receive the sensor signal from sensor 112, and transmit a trigger signal to the image capture device responsive to detecting the triggering event from the sensor signal. In accordance with the techniques of this disclosure, the hub 150 may include a personal computing device (e.g., a server computer, a desktop computer, a laptop computer, a tablet computer, a smartphone, a personal digital assistant (PDA), other personal computing device, or combinations thereof). In accordance with the techniques of this disclosure, the hub 150 may be configured to communicate with at least one of the sensor 112 and the image capture device 120 through a personal area network (PAN), a local area network (LAN), or a combination thereof with or without intervention from a wide area network (WAN) (e.g., the Internet). In accordance with the techniques of this disclosure, the hub 150 may include one or more cloud server devices configured to engage in electrical communications with at least one of the sensor 112 and the image capture device 120 through at least a WAN. In accordance with the techniques of this disclosure, the hub 150 may be the heart of the disclosed system, responsible for processing the video data and running one or more ML models. In accordance with the techniques of this disclosure, the hub 150 may further include a database that may store the collected video data for analysis and training. In accordance with the techniques of this disclosure, the hub 150 and the database may be scaled to handle increasing amounts of data as the technician assistance system 100 grows.

In operation, the sensor 112 may detect information about events occurring in proximity to the wearable object 110. The sensor 112 may detect something happening nearby. The occurring event could be a sound, movement, or other event. The sensor 112 may transmit the sensor signal including the information about the detected events to at least one of the image capture device 120 and the hub 150 through the communication elements. The information from the sensor signal may be processed by one of the image capture device 120 and the hub 150 to determine if a triggering event occurred.

In accordance with the techniques of this disclosure, if a triggering event occurred, the image capture device 120 may record information corresponding to the events that occur in proximity to the wearable object 110. In accordance with the techniques of this disclosure, the image capture device 120 may stop recording the information a predetermined amount of time after the triggering event, in response to a manual input to the image capture device 120, in response to another detected event, in response to a command received from one of the sensor 112 and the hub 150, in response to a voice command received from an MRO technician via a voice interface, or combinations thereof. In accordance with the techniques of this disclosure, information (e.g., video data) may be recorded responsive to an event that is detectable by the sensor 112 without the need for a manual input, voice input, or timer to start the recording.

For example, an MRO technician may attempt to remove an engine from an aircraft. Accordingly, potentially relevant training video footage of events involving (and even leading up to) the removal of an engine from an aircraft may be captured by the image capture device 120 without the need for the MRO technician to constantly accrue video footage or take the time to manually start the recording during an important task.

In accordance with the techniques of this disclosure, the technician assistance system 100 may allow MRO technicians to control when the disclosed system is active and inactive, which may be important for privacy of MRO technicians. For example, MRO technicians may ensure their personal activities are not being recorded or analyzed. The technician assistance system 100 may be activated only when needed, saving battery life and reducing data transmission. In accordance with the techniques of this disclosure, the technician assistance system 100 may learn the preferences and habits of MRO technicians, providing more personalized assistance.

In accordance with the techniques of this disclosure, the technician assistance system 100 may further include one or more Machine Learning (ML) models 160 that may be executed by the hub 150. In accordance with the techniques of this disclosure, the one or more ML models 160 may build a knowledge base by learning domain, industry, enterprise, group, and/or person-specific tasks and/or vocabularies and task relationships from the combination of structured and unstructured data. Then the one or more ML models 160 may combine in such knowledge base captured video data, natural language processing (NLP), deep learning, data science, and cognitive techniques to understand actions performed by an actor (e.g., an MRO technician), synthesize knowledge, and deliver personalized insights, actions, and analytics, through one or more smart interfaces. In this regard, in some implementations, the one or more ML models 160 may build further on the newly received video data and/or interactive nature of human conversations, the one or more ML models 160 may adaptively learn previously unseen actions, events, and semantics, and may infer user context and intent to help an actor to perform a particular task. The video data may be processed in real-time, ensuring ML models 160 provide timely feedback and suggestions.

In accordance with the techniques of this disclosure, by integrating data from the avionics systems of the aircraft, the ML models 160 may analyze aircraft sensor readings and identify potential issues before the issues become major problems. Analyzed avionics data may allow for preventive maintenance and may reduce the risk of unexpected downtime. ML models 160 may analyze data to more accurately diagnose issues and provide efficient troubleshooting steps. The ML models 160 may be trained on technical publications and manufacturer manuals to access a vast knowledge base of repair procedures and troubleshooting steps. By also collecting video data from multiple MRO technicians, the ML models 160 may continuously learn and improve generated suggestions, becoming a valuable resource for technicians across the MRO facility. The ML models 160 may provide immediate suggestions and guidance based on the actions of the MRO technician and the variety of data available to the ML models 160. Real-time feedback may expedite troubleshooting and ensure repairs are performed correctly. Trained on aviation data, the ML model may analyze the video data and may provide real-time suggestions and guidance. The term "aviation data," as used herein, refers to all data related to aircraft and aviation operations. The term aviation data includes avionics data as well as other types of data, such as, but not limited to, meteorological data, air traffic control data, economic data (e.g. data related to the aviation industry, such as passenger numbers, cargo volume, and fuel prices), and regulatory data. The ML model 160 may continuously learn from the combined data, improving accuracy and relevance over time.

In accordance with the techniques of this disclosure, one or more ML models 160 may construct and continuously enrich its knowledge base, which may be implemented as knowledge graphs, and may utilize such knowledge to understand data and to understand an environment surrounding an actor. For example, the one or more ML models 160 may create and use a knowledge base, built using deep learning over the aggregation, assimilation, combination, and integration of both unstructured and structured data (e.g., captured video data). In accordance with the techniques of this disclosure, such a knowledge base may comprise one or more data entity relationship graphs or knowledge graphs, in which nodes of the graph represent entities or concepts and edges represent the relationships between those entities or concepts.

In accordance with the techniques of this disclosure, the one or more ML models 160 may learn the data, and may learn necessary means for accessing the data from a variety of sources 170. For example, one or more ML models 160 may access one or more sources 170 of unstructured data. Exemplary unstructured data may include, but is not limited to, product manuals, emails, and the like. In one example, the one or more sources 170 may include technical manuals and documentation from Original Equipment Manufacturers (OEMs).

These materials may contain detailed instructions, diagrams, and specifications for specific aircraft components, for example.

In one example, one of the one or more ML models 160 may comprise a Vision Language Model (VLM). VLMs are a type of artificial intelligence that may process and understand both images and text. VLMs combine the capabilities of computer vision and NLP to perform tasks that require understanding and generating information from both visual and textual sources. The VLM first processes an image using a computer vision model, extracting relevant features such as, but not limited to, object detection, scene understanding, or color information. The textual and/or voice component of the input may be processed using an NLP model, converting the component into a numerical representation that the model can understand. The image and text representations may be combined into a joint representation, allowing the VLM model to learn relationships between visual and textual elements. The VLM model may generate an output based on the specific task the VLM model is trained for. The specific task could be anything from image captioning to visual question answering. In one example, the VLM may generate descriptive text for images. In another example, the VLM may answer questions about images. The VLM may also extract information from documents (e.g., manuals) that contain both text and images. In one example, the VLM may comprise a CLIP (Contrastive Language-Image Pre-training), which is a popular model that was trained on a massive dataset of image-text pairs. In another example, the VLM may comprise a ViT (Vision Transformer), which is a transformer-based model designed for vision tasks.

As noted above, video data is essentially a sequence of still images, or frames. When a video is processed by one or more ML models 160, these frames may be extracted and analyzed individually. In one example, ML models 160 may include one or more video framing models. The video framing models may internally divide the captured video data into individual frames, typically at a specific rate (e.g., 30 frames per second) and/or may divide the video data into meaningful segments that may be analyzed by the generative ML model. By analyzing individual frames, ML models 160 may detect subtle changes or anomalies that might be missed in a more holistic approach. Each frame may be analyzed independently by the ML models 160. This can involve tasks like object detection, motion tracking, or scene understanding. Relevant data may be extracted from each frame, such as, but not limited to, the presence of certain objects, locations of certain objects, or changes in the scene. The extracted data from multiple frames may be combined to understand the overall context of the video data. Understanding the overall context may involve, for example, identifying events, sequences of actions, or relationships between objects. Modern video processing techniques may efficiently handle large volumes of video data, making frame-based analysis feasible in real-time. By combining video analytics with a generative model, ML models 160 may detect actions (e.g., tool usage, equipment inspection, or component replacement), unusual activities or equipment malfunctions that could lead to safety issues or downtime. ML models 160 may ensure MRO technicians are following safety procedures and avoiding hazardous situations. In another non-limiting example, ML models 160 may offer real-time tailored suggestions based on the detected activities and the surrounding environment. In one example, the one or more suggestions generated by ML models 160 may include natural language instructions on how to perform a particular task. The natural language instructions may be tailored to a particular task, providing step-by-step guidance or suggestions on how to proceed. In other words, ML models 160 may act as a helper, offering advice or recommendations to assist MRO technicians in completing the task.

The video data captured by the image capture device 120 may be provided as input to the ML models 160. While the technician assistance system 100 may operate continuously, adding an on/off switch, event-based triggering, or voice command processing described in this disclosure may help optimize data collection and transmission, especially in scenarios with limited bandwidth or storage.

As discussed above, the generative model of the one or more ML models 160 may be specifically trained on aviation data. In accordance with the techniques of this disclosure, the generative model may be smaller and simpler than Large Language Models (LLMs). By training the generative model specifically on aviation data, including technical publications, avionics manuals, and repair procedures, MRO facilities may ensure that the generative model can understand the specific terminology, processes, and equipment relevant to MRO tasks. A smaller specialized generative model may process information and may generate suggestions much faster than a large language model that needs to search through a vast amount of general data. This aspect may be important for real-time guidance in MRO situations. As another benefit, a smaller, custom model may require less computational power and resources to run, making the custom made generative model more cost-effective and potentially easier to integrate with wearable objects 110. Training on domain-specific data may reduce the risk of irrelevant or inaccurate suggestions, leading to more reliable assistance for MRO technicians.

In one non-limiting example, the hub 150 may receive video data capturing a first MRO technician removing an engine from an aircraft. In one non-limiting example, the one or more ML models 160 may store the received video data in a knowledge base, the stored video data may have a label indicating that the stored video data captures removal of an engine. If at some point in a future a second MRO technician sends a query to the assistance system 100 requesting instructions on how to remove an engine, one or more ML models 160 may analyze the corresponding video data and may generate a sequence of steps that should be performed to accomplish the task at hand (in this case, removal of an engine). The generated output (e.g., the sequence of steps) may be rendered to the second MRO technician via computing device 122. In another non-limiting example, the assistance system 100 may monitor (e.g. record) the performance of the task at hand by the second MRO technician to identify any issues or problems. Responsive to identifying any issues or problems, one or more ML models 160 may provide one or more suggestions on how to address the identified issues via computing device 122.

Tracking the location of tools may be a common challenge in MRO facilities. In yet another non-limiting example, by leveraging the wearable technology and data collected from multiple wearable objects 110, over time, the technician assistance system 100 may identify the typical locations where MRO technicians store and retrieve tools. When an MRO technician needs a particular tool, the technician assistance system 100 may suggest most likely location of the particular tool based on past usage patterns. By tracking tool locations, the technician assistance system 100 may help prevent lost or misplaced tools. As a result, MRO technicians may locate tools faster, reducing downtime and improving productivity. Furthermore, fewer lost tools may save both time and money.

In yet another non-limiting example, the image capture device 120 (e.g., a video camera) may capture footage of first MRO technician performing the task (e.g., unmounting a fan). ML models 160 may receive the video data and may analyze the captured video data in real-time. For example, ML models 160 may identify the specific steps involved, such as, but not limited to, removing screws, disconnecting cables, and physically detaching the fan. ML models 160 may learn the sequence of steps the first MRO technician followed and may store this information in database of the hub 150. When a second MRO technician needs help reassembling the fan, the second MRO technician may request assistance from the technician assistance system 100. In accordance with the techniques of this disclosure, the technician assistance system 100 may retrieve the stored data related to the previous unmounting task and may provide step-by-step instructions on how to reassemble the fan. These generated instructions (output of the ML models 160) may include, but are not limited to: the correct order in which to reattach components; the appropriate tightening torque for screws and bolts; instructions on how to properly align components. In addition, ML models 160 may provide reminders to follow safety procedures. Advantageously, by providing real-time guidance based on previous actions of another MRO technician, the technician assistance system 100 may ensure that components are reassembled correctly, preventing malfunctions or safety hazards. The technician assistance system 100 may streamline the reassembly process, saving time and effort.

In accordance with the techniques of this disclosure, a wearable device, such as a smart watch or headset, may be integrated into wearable object 110 (e.g., a wearable body suit) for hands-free operation. Using the wearable device(s) the technician assistance system 100 may provide real-time voice instructions and alerts directly to the MRO technician through a voice interface of the wearable device. Based on the video data and the analyzed actions of an MRO technician, the technician assistance system 100 may provide specific guidance, such as "Check the oil level in the engine" or "Disconnect the red cable before proceeding." The technician assistance system 100 may also detect anomalies, such as, but not limited to, oil leaks, and may alert the MRO technician immediately via the wearable device. As noted above, real-time alerts and guidance may help prevent accidents and ensure MRO technicians follow safety procedures. Hands-free operation and immediate feedback may further streamline inspections and maintenance tasks. The technician assistance system 100 may help technicians identify potential issues and perform tasks correctly, reducing the risk of errors.

In one non-limiting example, the technician assistance system may be called "an MRO Copilot". In one example, MRO technicians may activate the technician assistance system 100 using voice commands, such as "Hey MRO Copilot, start recording." Once activated, the technician assistance system 100 may then provide real-time voice prompts, guiding the MRO technician through tasks and highlighting potential issues. Hands-free operation may allow MRO technicians to focus on their work without having to constantly look at a screen of tablet or another computing device 122. Hands-free operation allows MRO technicians to work more efficiently and safely. Voice commands may make it simple to activate and use the technician assistance system 100.

In accordance with the techniques of this disclosure, integrating video feed capabilities into the technician assistance system 100 may provide even more valuable information and assistance to MRO technicians. In one example, the technician assistance system 100 may transmit the live video feed from the hub 150 to the computing device 122. In one example, the video feed may provide instructions, real time guidance or troubleshooting assistance. Video feed may provide specialized guidance based on the visual data. New MRO technicians may learn in real-time by watching the same task performed by experienced experts. In another example, the video recordings may be used as documentation of maintenance activities.

In summary, wearable object 110, such as, but not limited to a wearable body suit, may house sensor 112, image capture device 120 (e.g., a camera), a speaker, and/or other sensors/wearable devices. The wearable object 110 may transmit live video data to hub 150, which may be a central server or cloud platform. One or more ML models 160 may process the video data and may provide real-time guidance and suggestions. In one example, the ML models 160 may be specifically trained on aviation data. ML models 160 may analyze the live video feed from the image capture device 120 and may provide real-time guidance based on what the MRO technician is doing. In other words, the technician assistance system 100 may act like a virtual assistant standing beside the MRO technician, offering suggestions and addressing immediate needs. The technician assistance system 100 may identify the task the technician is performing (e.g., unmounting an engine). Based on the task and the actions of the MRO technician, the technician assistance system 100 may suggest relevant steps or troubleshooting advice. If the MRO technician needs more detailed information, the technician assistance system 100 may potentially offer links to relevant sections within the OEM manuals (if accessible via APIs or internal systems of the hub 150).

In one example, the technician assistance system 100 may start with a foundation model, likely a pre-trained ML language model, that has a broad understanding of language and information. This base ML language model may then be fine-tuned on a large dataset of aviation-related information, including, but not limited to, technical manuals, maintenance procedures, and industry best practices. This training/ fine-tuning process may specialize the ML models 160 for the aviation domain. In some examples, the fine-tuned ML model(s) 160 may be further customized for specific MRO tasks or aircraft types. Such customization may involve training the ML model(s) 160 on additional data relevant to the particular use case. In this case, by starting with a pre-trained model, the development process may be accelerated. The ML models 160 may be easily adapted to different MRO scenarios or aircraft types. Accordingly, the technician assistance system 100 may be scaled relatively easily to handle increasing amounts of data and complexity.

Figure 2:
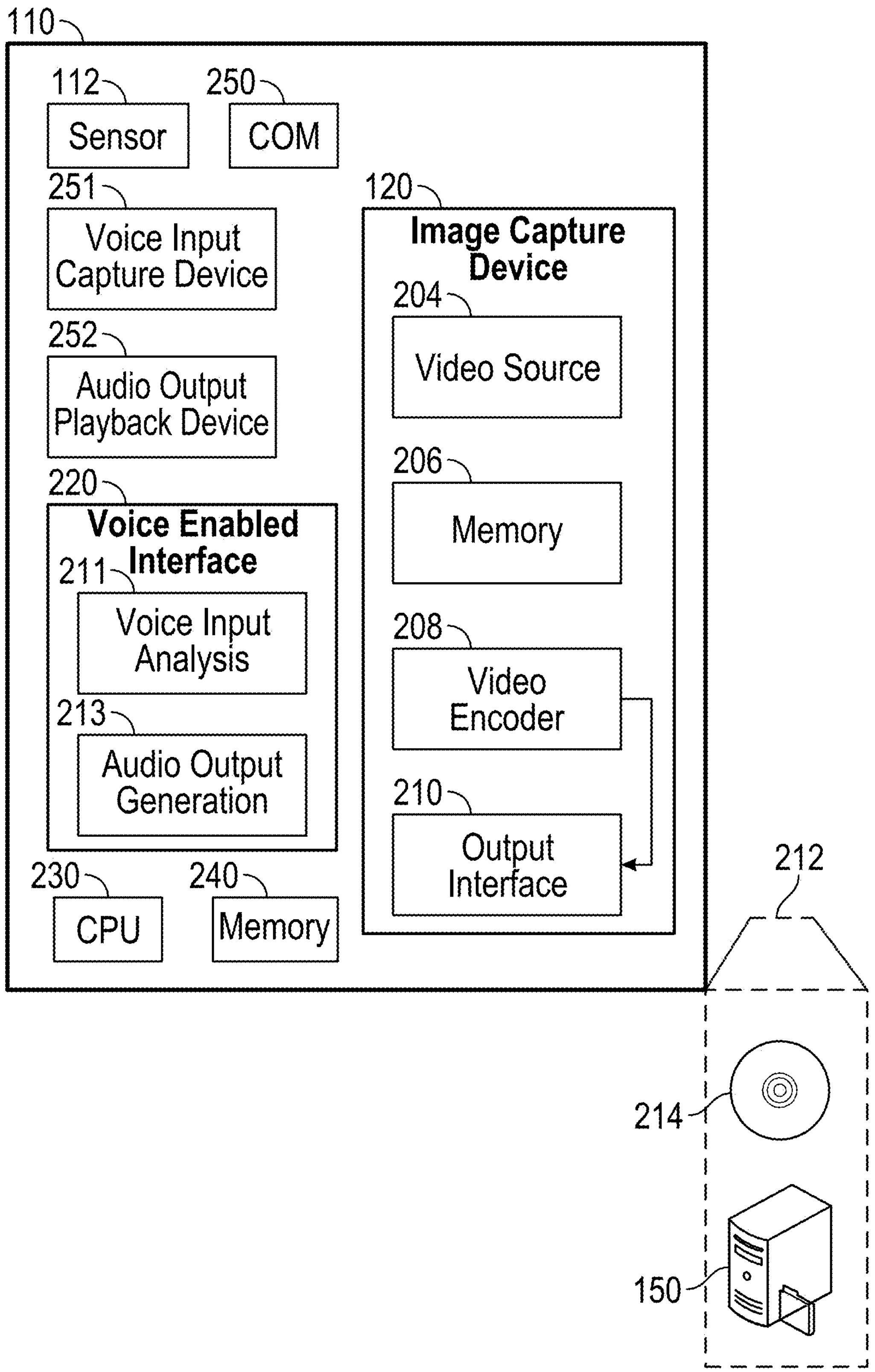
FIG. 2 is a block diagram illustrating an example wearable object that may perform the techniques of this disclosure.

FIG. 2 is a block diagram illustrating an example wearable object 110 that may perform the techniques of this disclosure. In an example, wearable object 110 may include image capture device 120, one or more sensors 112, voice input capture device 251, audio output playback device 252, voice enabled interface 220, CPU 230, memory 240, and communication interface 250. In other examples, wearable object 110 may include other components or arrangements.

With respect to video, the techniques of this disclosure are generally directed to coding (encoding and/or decoding) video data as well as processing video data. In general, video data includes any data for processing a video. Thus, video data may include raw, unencoded video, encoded video, decoded (e.g., reconstructed) video, and video metadata, such as signaling data.

As shown in FIG. 1, image capture device 120 may provide the video data to hub 150. In some cases, wearable object 110 may be equipped for wireless communication via communication interface 250, and thus may be referred to as wireless communication device. In other words, wearable object 110 may send and receive data without needing physical cables.

In the example of FIG. 2, image capture device 120 may include video source 204, memory 206, video encoder 208, and output interface 210. Thus, image capture device 120 represents an example of a video encoding device. In other examples, image capture device 120 may include other components or arrangements.

Image capture device 120 is merely an example of coding devices in which image capture device 120 generates coded video data for transmission to hub 150. This disclosure refers to a "coding" device as a device that performs coding (encoding and/or decoding) of video data. Thus, video encoder 208 represents an example of coding devices, in particular, a video. In some examples, technician assistance system 100 may support one-way or two-way video transmission between image capture device 120 and hub 150, e.g., for video streaming, video playback, video broadcasting, or video telephony.

In general, video source 204 represents a source of video data (i.e., raw, unencoded video data) and provides a sequential series of pictures (also referred to herein as "frames") of the video data to video encoder 208, which encodes data for the pictures. In some examples, video source 204 may generate computer graphics-based data as the source video, or a combination of live video, archived video, and computer-generated video. In each case, video encoder 208 may encode the captured, pre-captured, or computer-generated video data. Video encoder 208 may rearrange the pictures from the received order (sometimes referred to as "display order") into a coding order for coding. Video encoder 208 may generate a bitstream including encoded video data. Image capture device 120 may then output the encoded video data via output interface 210 onto computer-readable medium 212 for reception and/or retrieval by, e.g., input interface of computing device 122.

Memory 206 of image capture device 120 may represent general purpose memory. In some examples, memory 206 may store raw video data, e.g., raw video from video source 204. Additionally or alternatively, memory 206 may store software instructions executable by, e.g., video encoder 208. Although memory 206 is shown separately from video encoder 208 in this example, it should be understood that video encoder 208 may also include internal memories for functionally similar or equivalent purposes. Furthermore, memory 206 may store encoded video data, e.g., output from video encoder 208. In some examples, portions of memory 206 may be allocated as one or more video buffers, e.g., to store raw, decoded, and/or encoded video data.

In some examples, image capture device 120 may process the video data and may convert the video data into a compressed format, often referred to as encoded data. Output interface 210 may be the connection point where the encoded data may be sent. Output interface 210 may output the encoded data to storage device 214. Storage device 214 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

Output interface 210 of image capture device 120 may also be communicatively connected to communication interface 250 of wearable object 110. Communication interface 250 may represent wireless transmitters/receivers, modems, wired networking components (e.g., Ethernet cards), wireless communication components that operate according to any of a variety of IEEE 802.11 standards, or other physical components. In examples where communication interface 250 includes wireless components, communication interface 250 may be configured to transfer data, such as encoded video data, audio data, etc., according to a cellular communication standard, such as 4G, 4G-LTE (Long-Term Evolution), LTE Advanced, 5G, or the like. In some examples where communication interface 250 includes a wireless transmitter, output interface 210 may be configured to transfer data, such as encoded video data, according to other wireless standards, such as an IEEE 802.11 specification, an IEEE 802.15 specification (e.g., ZigBee™), a Bluetooth™ standard, or the like.

In some examples, image capture device 120 may include respective system-on-a-chip (SoC) devices. For example, image capture device 120 may include an SoC device to perform the functionality attributed to video encoder 208 and/or output interface 210.

The techniques of this disclosure may be applied to video coding in support of any of a variety of multimedia applications, such as Internet streaming video transmissions, such as dynamic adaptive streaming over HTTP (DASH), digital video that is encoded onto a data storage medium, decoding of digital video stored on a data storage medium, or other applications.

Although not shown in FIG. 2, in some examples, video encoder 208 may be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB). G.723.1, G.726, G.728, G.729, G.729.1, GSM-FR, HE-AAC, iLBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, True Audio (TTA), TwinVQ, USAC, Vorbis (Ogg), WavPack, and Windows Media Aud.

CPU 230 may be implemented as any of a variety of suitable circuitry that includes a processing system, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

Video encoder 208 may be included in one or more encoders or decoders, either of which may be integrated as part of a combined encoder/decoder (CODEC) in a respective device. Video encoder 208 may operate according to a video coding standard, such as ITU-T H.265, also referred to as High Efficiency Video Coding (HEVC) or extensions thereto, such as the multi-view and/or scalable video coding extensions. Alternatively, video encoder 208 may operate according to other proprietary or industry standards, such as ITU-T H.266, also referred to as Versatile Video Coding (VVC). In other examples, video encoder 208 may operate according to a proprietary video codec/format, such as AOMedia Video 1 (AV1), extensions of AV1, and/or successor versions of AV1 (e.g., AV2). In other examples, video encoder 208 may operate according to other proprietary formats or industry standards. The techniques of this disclosure, however, are not limited to any particular coding standard or format.

In general, video encoder 208 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 208 may code video data represented in a red, green, and blue (RGB) format. Video encoder 208 may code luminance and chrominance components, where the chrominance components may include both red hue and blue hue chrominance components.

This disclosure may generally refer to coding (e.g., encoding) of pictures to include the process of encoding data of the picture. Similarly, this disclosure may refer to coding of blocks of a picture to include the process of encoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 208 may be configured to operate according to VVC. According to VVC, a video coder (such as video encoder 208) partitions a picture into a plurality of CTUs. Video encoder 208 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

As shown in FIG. 2, wearable object 110 may also include one or more sensors 112. In an example, one or more sensors may include, but are not limited to, proximity sensors, GPS sensors, accelerometers, gyroscopes, light sensors, noise sensors, and the like. Proximity sensors may detect the presence of objects nearby. GPS sensors may determine location and position. Accelerometers may measure acceleration, which can be used to detect movement, shaking, or impacts. Gyroscopes may measure angular velocity, which may be used to track rotation and orientation. Light sensors may measure light intensity. Noise sensors may measure sound levels.

As shown in FIG. 2, wearable object 110 may include one or more voice-capturing devices such as voice input capture device 251, which may interact with one or more users (e.g., MRO technicians). The devices may be referred to herein as voice-capturing devices or voice-capturing endpoints and may include a voice interaction capability. In an aspect, wearable object 110 may include a voice input capture component, such as one or more microphones and/or other suitable voice-capturing or audio input component(s), usable to capture audio input including speech. In one example, wearable object 110 may include an audio output component, such as audio output playback device 252, which may include one or more speakers and/or other suitable audio output component(s), usable to play back audio data including computer-generated speech. Representations of voice input, such as audio data, transcriptions of audio data, and other artifacts, may be stored in memory 240. Using the techniques described herein, the stored representations of voice input from the devices may be deleted based (at least in part) on other voice input from the devices.

The devices, including voice input capture device 251 may send voice input to the voice-enabled interface 220. Using a voice input analysis component 211, the voice-enabled interface 220 may analyze the voice input and take one or more actions responsive to the voice input, such as initiating one or more tasks. Using an audio output generation component 213, the voice-enabled interface 220 may generate and send audio output (e.g., synthetic or computer-generated speech output, pre-recorded audio, voicemail, music, and so on) to audio output playback device 252 for playback on wearable object 110.

Using a voice input capture device 251 such as one or more microphones, a particular wearable object 110 may be configured to capture voice input. In one example, the voice input may represent speech input from one or more MRO technicians. The speech may include natural language speech. The voice input may represent digital audio in any suitable format. The voice input may be streamed or otherwise sent from the computing device 122 to the communication interface 250. Using the voice input analysis 211, the voice enabled interface 220 may decode the voice input to determine one or more terms, phrases, or other utterances that are present in the audio. In one example, one or more of the terms may represent commands to invoke functions provided by the technician assistance system 100.

Memory 240 of wearable object 110 may represent general purpose memory. Additionally or alternatively, memory 240 may store software instructions executable by various components of wearable object 110 illustrated in FIG. 2.

Figure 3:
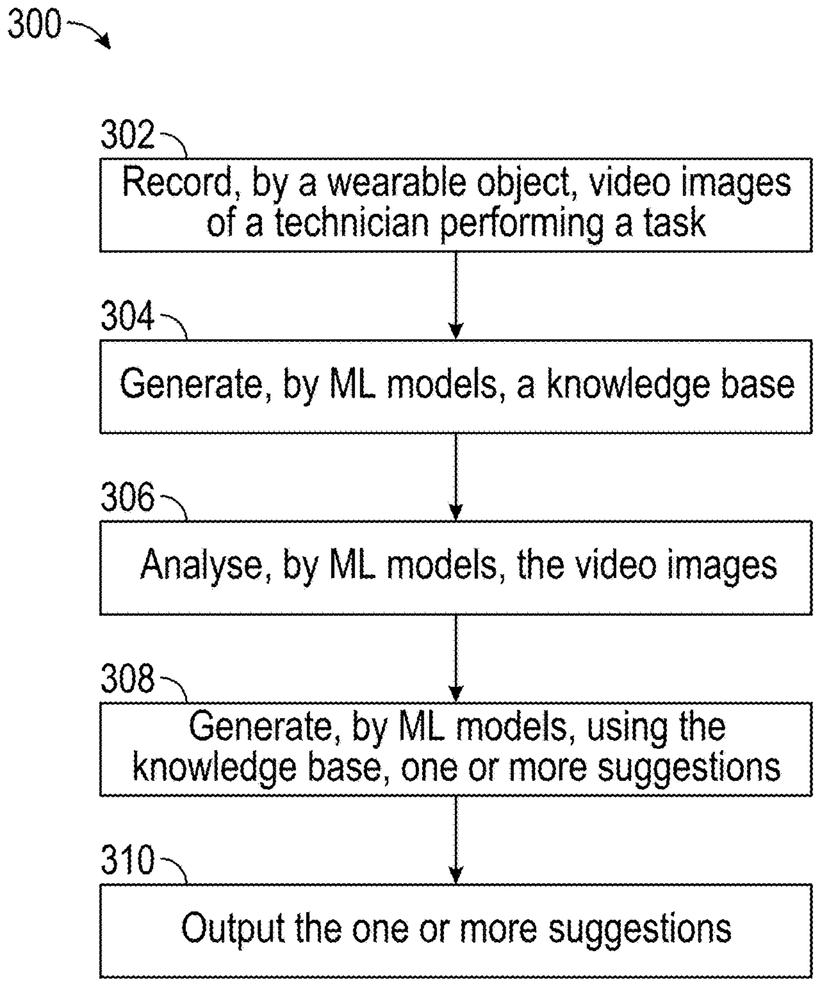
FIG. 3 depicts a flowchart illustrating a process for providing AI-based technician assistance, in accordance with the techniques of the present disclosure.

FIG. 3 depicts a flowchart illustrating a process for providing AI-based technician assistance, in accordance with the techniques of the present disclosure.

Process 300 will be described with respect to AI-based technician assistance system 100, but it should be understood that other computing systems may also be configured to perform process 300. Wearable object 110, such as, but not limited to a wearable body suit, may house sensor 112, image capture device 120 (e.g., a camera), voice input capture device 251, audio output playback device 252 and/or other sensors/wearable devices may record video images of a technician performing a task (302). The wearable object 110 may transmit live video data to hub 150, which may be a central server or cloud platform. Image capture device 120 is merely an example of coding devices in which image capture device 120 generates coded video data for transmission to hub 150. In accordance with the techniques of this disclosure, potentially relevant training video footage of events involving (and even leading up to), such as the task of removal of an engine from an aircraft may be captured by the image capture device 120 without the need for an MRO technician to constantly accrue video footage or take the time to manually start the recording during an important task. Next, ML models 160 may generate a knowledge base using the video images recorded by the image capture device 120 and using at least one of structured data or unstructured data obtained from one or more data sources 170 (304). For example, the ML models 160 may create and use of a knowledge base, built using deep learning over the aggregation, assimilation, combination, and integration of both unstructured and structured data (e.g., captured video data). In accordance with the techniques of this disclosure, such a knowledge base may comprise one or more data entity relationship graphs or knowledge graphs.

In accordance with the techniques of the present disclosure, the ML models 160 may analyze the video images of the technician performing the task to identify the task being performed (306). In essence, when a video is processed by one or more ML models 160, these frames may be extracted and analyzed individually. In one example, ML models 160 may include one or more video framing models. Additionally, the ML models 160 may generate, using the knowledge base, one or more suggestions related to the task being performed (308) and may output the generated suggestions (310). By collecting video data from multiple MRO technicians, ML models 160 may continuously learn and improve generated suggestions, becoming a valuable resource for technicians across the MRO facility. The ML models 160 may provide immediate suggestions and guidance based on the actions of the MRO technician and the variety of data available to the ML models 160.

Figure 4:
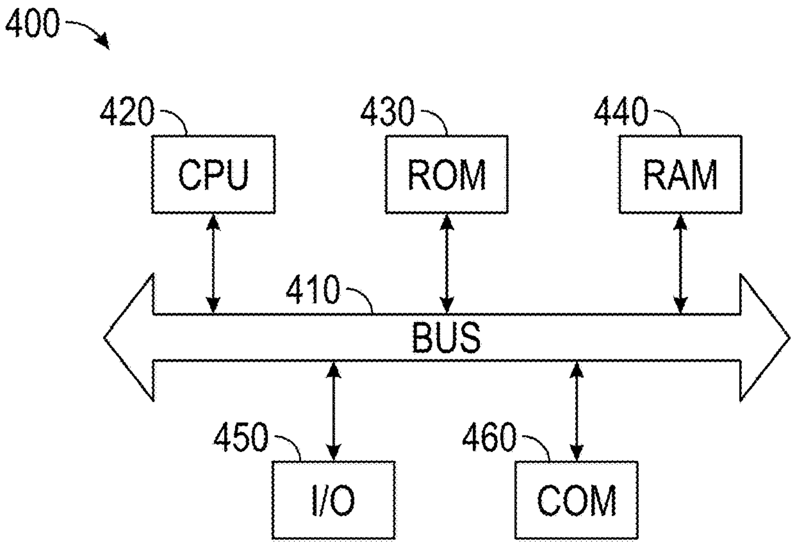
FIG. 4 depicts an example system that may execute techniques presented herein.

FIG. 4 depicts an example system 400 that may execute techniques presented herein. FIG. 4 is a simplified functional block diagram of hub 150 that may be configured to execute techniques described herein, according to examples of the present disclosure. Specifically, the hub 150 (or "platform" as it may not be a single physical computer infrastructure) may include a data communication interface 460 for packet data communication. Data communication interface 460 may allow the hub 150 to connect to other devices and exchange data. The platform also may include a central processing unit ("CPU") 420, in the form of one or more processors. The CPU 420 may be responsible for executing instructions and performing calculations. The platform may include an internal communication bus 410, and the platform also may include a program storage and/or a data storage for various data files to be processed and/or communicated by the platform such as ROM (Read-Only memory) 430 and RAM (Random Access Memory) 440, although the system 400 may receive programming and data via network communications. The internal communication bus 410 may be a network within the hub 150 that may allow different components to communicate with each other. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

In one example, CPU 420 may execute one or more ML models 160. As noted above, ML models 160 may generate a knowledge base using the video images recorded by the wearable object 110 and using at least one of structured data or unstructured data obtained from one or more data sources 170. For example, the ML models 160 may create and use of a knowledge base, built using deep learning over the aggregation, assimilation, combination, and integration of both unstructured and structured data (e.g., captured video data). In accordance with the techniques of this disclosure, such a knowledge base may comprise one or more data entity relationship graphs or knowledge graphs.

The following numbered examples illustrate various aspects of the systems and techniques described above.

Example 1. An Artificial Intelligence (AI)-based technician assistance system includes: a wearable object comprising an image capture device embedded therein, the image capture devices configured to record video images of a technician performing a task; and a computing device comprising: a memory; and one or more processors coupled to the memory, implemented in circuitry, and configured to: generate, by one or more machine learning models, a knowledge base using the video images recorded by the image capture device and using at least one of structured data or unstructured data obtained from one or more data sources; analyze, by the one or more machine learning models, the video images of the technician performing the task to identify the task being performed; generate, by the one or more machine learning models, using the knowledge base, one or more suggestions related to the task being performed; and output the one or more suggestions generated by the one or more machine learning models.

Example 2. The assistance system of example 1, wherein the wearable object further comprises: one or more sensors configured to detect a triggering event and wherein the image capture device is configured to start recording responsive to the triggering event detected by the one or more sensors.

Example 3. The assistance system of example 1 or 2, wherein the image capture device is configured to one or both of start recording and stop recording responsive to a voice command received from the technician.

Example 4. The assistance system of any of examples 1-3, wherein the one or more processors are configured to: generate a training video related to the task being performed based on the video images recorded by the image capture device; and output the training video.

Example 5. The assistance system of any of examples 1-4, wherein the wearable object further comprises an audio output component configured to output audio data.

Example 6. The assistance system of any of examples 1-5, wherein the knowledge base comprises a knowledge graph.

Example 7. The assistance system of any of examples 1-6, wherein the one or more machine learning models are trained on aviation data.

Example 8. The assistance system of any of examples 1-7, wherein the one or more suggestions comprise natural language instructions on how to perform the task.

Example 9. The assistance system of any of examples 1-8, wherein the one or more suggestions comprise a suggested location of a particular tool determined based on past usage patterns.

Example 10. The assistance system of any of examples 1-9, wherein the one or more machine learning models comprise a Vision Language Model (VLM).

Example 11. The assistance system of any of examples 1-10, wherein the unstructured data comprises technical manuals and documentation from Original Equipment Manufacturers (OEMs).

Example 12. A method for providing AI-based technician assistance comprising: recording, by a wearable object comprising an image capture device embedded therein, video images of a technician performing a task; generating, by one or more machine learning models, a knowledge base using the video images recorded by the image capture device and using at least one of structured data or unstructured data obtained from one or more data sources; analyzing, by the one or more machine learning models, the video images of the technician performing the task to identify the task being performed; generating, by the one or more machine learning models, using the knowledge base, one or more suggestions related to the task being performed; and outputting the one or more suggestions generated by the one or more machine learning models.

Example 13. The method of example 12, wherein the wearable object further comprises one or more sensors configured to detect a triggering event and wherein the method further comprises: starting the recording responsive to the triggering event detected by the one or more sensors.

Example 14. The method of example 12 or 13, wherein the image capture device is configured to one or both of start recording and stop recording responsive to a voice command received from the technician.

Example 15. The method of any of examples 12-14, further comprising: generating a training video related to the task being performed based on the video images recorded by the image capture device; and outputting the training video.

Example 16. The method of any of examples 12-15, wherein the wearable object further comprises an audio output component configured to output audio data.

Example 17. The method of any of examples 12-16, wherein the knowledge base comprises a knowledge graph.

Example 18. The method of any of examples 12-17, further comprising: training the one or more machine learning models on aviation data.

Example 19. The method of any of examples 12-18, wherein the one or more suggestions comprise natural language instructions on how to perform the task.

Example 20. The method of any of examples 12-19, wherein the one or more suggestions comprise a suggested location of a particular tool determined based on past usage patterns.

The general discussion of the present disclosure provides a brief, general description of a suitable computing environment in which the present disclosure may be implemented. Any of the disclosed systems, processes, and/or graphical user interfaces may be executed by or implemented by a computing system consistent with or similar to that depicted and/or explained in the present disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

One or more includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, but these elements should not be limited by these terms. Except where otherwise indicated, these terms are only used to distinguish one element from another. For example, a first contact could be termed a second contact, and, similarly, a second contact could be termed a first contact, without departing from the scope of the various described examples. The first contact and the second contact are both contacts but may not be the same contact.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In the present disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout the present disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

Various examples have been described. These and other examples are within the scope of the following claims.

What is claimed is:

1. An Artificial Intelligence (AI)-based technician assistance system, the assistance system comprising:

a wearable object comprising an image capture device embedded therein, the image capture devices configured to record video images of a technician performing a task; and a computing device comprising:

a memory; and one or more processors coupled to the memory, implemented in circuitry, and configured to:

generate, by one or more machine learning models, a knowledge base using the video images recorded by the image capture device and using at least one of structured data or unstructured data obtained from one or more data sources including previously recorded videos of the same task performed by other technicians;

analyze, by the one or more machine learning models, the video images of the technician performing the task to identify the task being performed and a current step of the task;

generate, by the one or more machine learning models, using the knowledge base, one or more suggestions related to the task being performed including step-specific guidance for the current step; and output the one or more suggestions generated by the one or more machine learning models.

2. The assistance system of claim 1, wherein the wearable object further comprises: one or more sensors configured to detect a triggering event and wherein the image capture device is configured to start recording responsive to the triggering event detected by the one or more sensors.

3. The assistance system of claim 1, wherein the image capture device is configured to one or both of start recording and stop recording responsive to a voice command received from the technician.

4. The assistance system of claim 1, wherein the one or more processors are configured to: generate a training video related to the task being performed based on the video images recorded by the image capture device; and output the training video.

5. The assistance system of claim 1, wherein the wearable object further comprises an audio output component configured to output audio data.

6. The assistance system of claim 1, wherein the knowledge base comprises a knowledge graph.

7. The assistance system of claim 1, wherein the one or more machine learning models are trained on aviation data.

8. The assistance system of claim 1, wherein the one or more suggestions comprise natural language instructions on how to perform the task.

9. The assistance system of claim 1, wherein the one or more suggestions comprise a suggested location of a particular tool determined based on past usage patterns.

10. The assistance system of claim 1, wherein the one or more machine learning models comprise a Vision Language Model (VLM).

11. The assistance system of claim 1, wherein the unstructured data comprises technical manuals and documentation from Original Equipment Manufacturers (OEMs).

12. A method for providing Artificial Intelligence (AI)-based technician assistance comprising:

recording, by a wearable object comprising an image capture device embedded therein, video images of a technician performing a task;

generating, by one or more machine learning models, a knowledge base using the video images recorded by the image capture device and using at least one of structured data or unstructured data obtained from one or more data sources including previously recorded videos of the same task performed by other technicians;

analyzing, by the one or more machine learning models, the video images of the technician performing the task to identify the task being performed and a current step of the task;

generating, by the one or more machine learning models, using the knowledge base, one or more suggestions related to the task being performed including step-specific guidance for the current step; and outputting the one or more suggestions generated by the one or more machine learning models.

13. The method of claim 12, wherein the wearable object further comprises one or more sensors configured to detect a triggering event and wherein the method further comprises:

starting the recording responsive to the triggering event detected by the one or more sensors.

14. The method of claim 12, wherein the image capture device is configured to one or both of start recording and stop recording responsive to a voice command received from the technician.

15. The method of claim 12, further comprising:

generating a training video related to the task being performed based on the video images recorded by the image capture device; and outputting the training video.

16. The method of claim 12, wherein the wearable object further comprises an audio output component configured to output audio data.

17. The method of claim 12, wherein the knowledge base comprises a knowledge graph.

18. The method of claim 12, further comprising: training the one or more machine learning models on aviation data.

19. The method of claim 12, wherein the one or more suggestions comprise natural language instructions on how to perform the task.

20. The method of claim 12, wherein the one or more suggestions comprise a suggested location of a particular tool determined based on past usage patterns.

* * * * *